United States Patent
Izawa et al.

(10) Patent No.: US 7,617,032 B2
(45) Date of Patent: Nov. 10, 2009

(54) CONTROL SYSTEM FOR ADJUSTABLE DAMPING FORCE

(75) Inventors: Masaki Izawa, Saitama (JP); Takafumi Kato, Saitama (JP); Shigenobu Sekiya, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 97 days.

(21) Appl. No.: 11/391,271

(22) Filed: Mar. 29, 2006

(65) Prior Publication Data

US 2006/0224285 A1   Oct. 5, 2006

(30) Foreign Application Priority Data

Mar. 30, 2005  (JP) ................... P.2005-098165

(51) Int. Cl.
*B60G 17/00* (2006.01)

(52) U.S. Cl. .................. 701/37; 280/5.5; 188/267.2

(58) Field of Classification Search ............. 701/37; 280/5.5; 188/267.2, 267.1, 269; *B60G 17/00*
See application file for complete search history.

(56) References Cited

U.S. PATENT DOCUMENTS

| | | | |
|---|---|---|---|
| 5,313,390 A | | 5/1994 | Schramm et al. |
| 5,632,361 A | * | 5/1997 | Wulff et al. ................ 188/267 |
| 5,652,704 A | * | 7/1997 | Catanzarite ................ 701/49 |
| 5,964,455 A | * | 10/1999 | Catanzarite et al. ......... 267/131 |
| 5,984,056 A | * | 11/1999 | Agnihotri et al. ......... 188/267.2 |
| 6,007,345 A | * | 12/1999 | Francis et al. ................. 439/34 |
| 6,279,701 B1 | * | 8/2001 | Namuduri et al. ........ 188/267.2 |
| 6,311,110 B1 | * | 10/2001 | Ivers et al. .................... 701/37 |
| 6,336,535 B1 | * | 1/2002 | Lisenker ................. 188/267.2 |
| 2005/0113997 A1 | * | 5/2005 | Kim ........................... 701/37 |

FOREIGN PATENT DOCUMENTS

| | | |
|---|---|---|
| DE | 37 29 187 C2 | 3/1989 |
| DE | 39 35 376 A1 | 10/1989 |
| JP | 60-113711 A | 6/1985 |
| JP | 03014935 A * | 1/1991 |
| JP | 11139132 A * | 5/1999 |
| JP | 2000179609 A * | 6/2000 |

* cited by examiner

*Primary Examiner*—Tuan C To
(74) *Attorney, Agent, or Firm*—Arent Fox LLP

(57) ABSTRACT

Upon searching control parameter used to adjust damping force of a damper from a map in accordance with damper speed and target damping force decided based on moving condition of the vehicle, the map sets the control parameter, which are relatively higher than the actual damping force characteristics, as map data in the area where the damper speed is less than a predetermined value, the area where the noise has the great influence on the sensor outputs. Therefore, it can be prevented that the control parameter of the damping force is varied largely or varied in a short period by the influence of noise, and the driving stability control of the vehicle can be executed exactly and the noise caused by switching the damping force of the damper can be reduced.

7 Claims, 5 Drawing Sheets

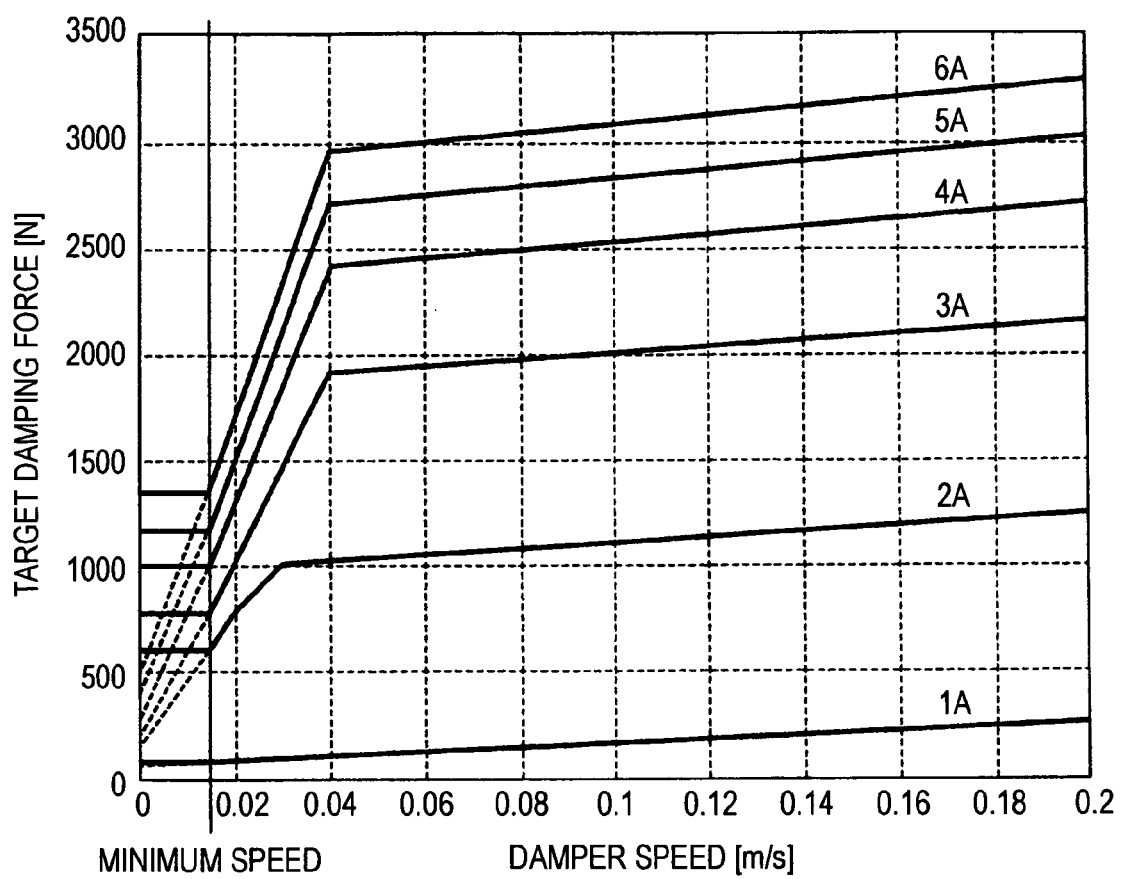

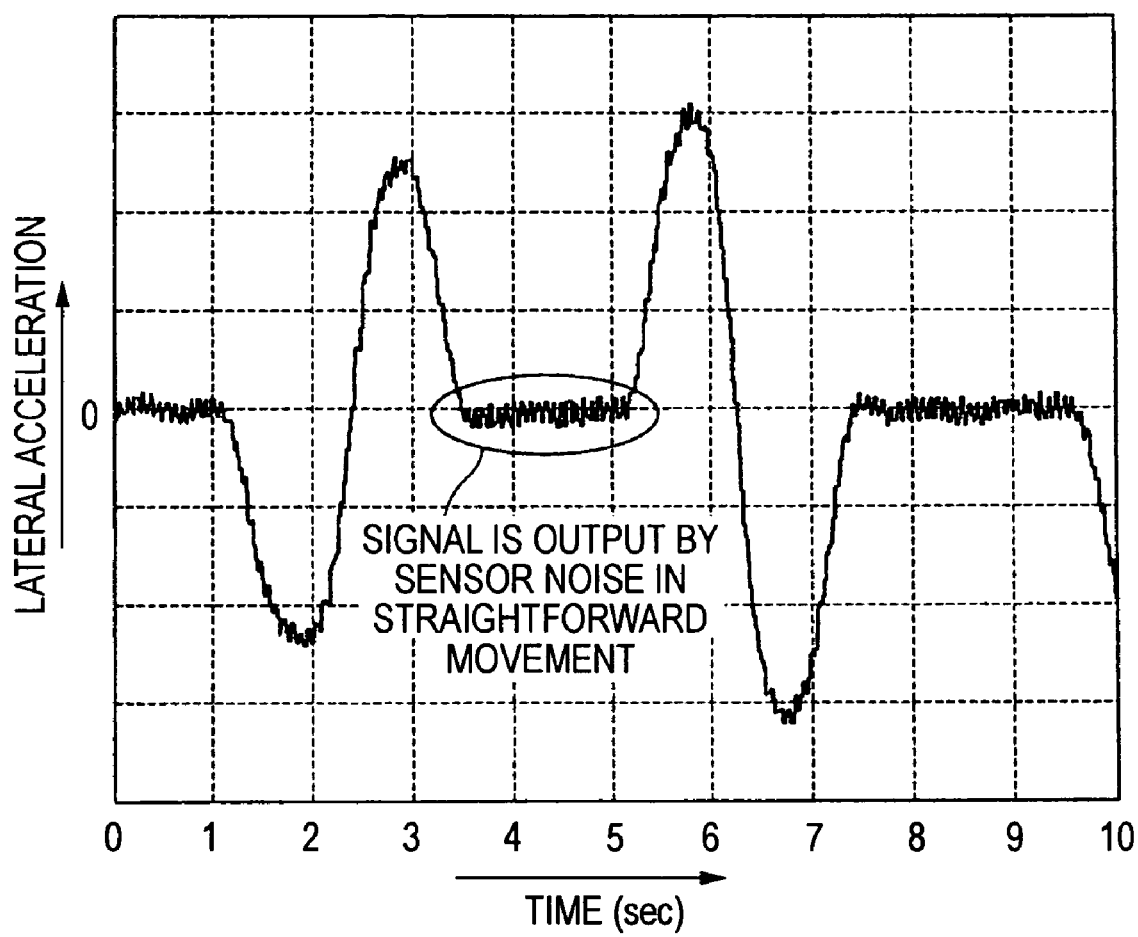

CONTROL SYSTEM FOR ADJUSTABLE DAMPING FORCE

The present invention claims foreign priority to Japanese patent application No. P.2005-098165, filed on Mar. 30, 2005, the contents of which is incorporated herein by reference.

BACKGROUND OF THE INVENTION

1. Field of the Invention

The present invention relates to a control system for a adjustable damping force, which controls variably an adjustable damping force of a damper provided to a suspension apparatus of a vehicle in response to a moving condition of the vehicle.

2. Description of the Background Art

In Japanese Patent Unexamined Publication No. JP-A-60-113711, the adjustable damping force in which MRF (Magneto-Rheological Fluids), whose viscosity is changed by applying a magnetic field, is employed as a viscous fluid of the adjustable damping force for the suspension apparatus and also a coil used to apply the magnetic field to the magneto-rheological fluids in the fluid passage is provided to a piston, which is slidably fitted into a cylinder, is known. According to this adjustable damping force, an damping force of this damper can be controlled arbitrarily by changing a viscosity of the magneto-rheological fluids in the fluid passage by applying the magnetic field generated by supplying an electric current to the coil.

An damping force generated by a adjustable damping force set forth in Japanese Patent Unexamined Publication No. JP-A-60-113711 is changed by a current supplied to a coil of the damper. When the driving stability control to suppress a rolling and a pitching of the vehicle by changing an damping force of the damper is to be carried out, a target damping force that is proportional to a rate of change in a lateral acceleration and a rate of change in a longitudinal acceleration of the vehicle sensed by a sensor with respect to time is calculated. Then, a current value to be supplied to the coil of the damper is searched from a map using this target damping force and a damper speed as parameters.

Meanwhile, it is inevitable that the noise is superposed on outputs of the sensors that sense the lateral acceleration and the longitudinal acceleration of the vehicle to calculate the target damping force of the damper. When the output of the sensor is large, an occupied rate of noise is small and the influence of noise is negligible. But an output itself of the sensor is small when the vehicle goes straight on at a constant speed, a occupied rate of noise in the sensor output is increased. In this manner, when a sensing precision of the lateral acceleration and the longitudinal acceleration sensed by the sensors is lowered by the noise, it is possible that a precision of the target damping force of the damper is lowered and then the driving stability control cannot be exactly executed.

SUMMARY OF THE INVENTION

The present invention has been made in light of the above circumstances, and it is an object of the present invention to suppress an influence of noises on outputs of sensors, which sense a moving condition of a vehicle, to the lowest minimum to control an damping force of a damper in a suspension system.

In order to achieve the above object, according to a first aspect of the present invention, there is provided a control system for a adjustable damping force, comprising:

a damper provided on a suspension apparatus of a vehicle;

a damper speed sensor detecting speed of the damper;

a moving condition sensor detecting moving condition of the vehicle; and a control unit determining target damping force in accordance with the moving condition, determining control parameter based the damper speed and the target damping force by using a map, and outputting the control parameter so as to adjust damping force of the damper, wherein the map is set so as to satisfy following conditions to thereby perform stable control of the damping force when the damper speed is not more than a predetermined value:

when the damper speed is constant value and is not more than the predetermined value, the control parameter is increased with gradient A as the target damping force is increased;

when the damper speed is constant value and is more than the predetermined value, the control parameter is increased with gradient B as the target damping force is increased, wherein the gradient A is larger than the gradient B; and when the target damping force is constant, the control parameter is decreased as the damper speed is increased.

According to a second aspect of the present invention, as set forth in the first aspect of the present invention, it is preferable that the map is set in such a manner that when the damper speed is not more than the predetermined value, the control parameter depends on the target damping force and the control parameter does not depend on the damper speed.

According to a third aspect of the present invention, as set forth in the first aspect of the present invention, it is preferable that the gradient A and B are positive values.

According to a fourth aspect of the present invention, as set forth in the first aspect of the present invention, it is preferable that the gradient A and B are variable relative to the damper speed and/or the target damping force.

According to a fifth aspect of the present invention, there is provided a control method for controlling damping force of a damper provided on a suspension apparatus of a vehicle, comprising the steps of:

determining target damping force based on a moving condition of a vehicle;

detecting damper speed;

determining control parameter of the damper based on the damper speed and the target damping force by using a map so as to adjust the damping force of the damper; and outputting the damping force to the damper, wherein the map is set so as to satisfy following conditions to thereby perform stable control of the damping force when the damper speed is not more than a predetermined value:

when the damper speed is constant value and is not more than the predetermined value, the control parameter is increased with gradient A as the target damping force is increased;

when the damper speed is constant value and is more than the predetermined value, the control parameter is increased with gradient B as the target damping force is increased, wherein the gradient A is larger than the gradient B; and when the target damping force is constant, the control parameter is decreased as the damper speed is increased.

According to a sixth aspect of the present invention, as set forth in the fifth aspect of the present invention, it is preferable that the map is set in such a manner that when the damper speed is not more than the predetermined value, the control parameter depends on the target damping force and the control parameter does not depend on the damper speed.

According to a seventh aspect of the present invention, as set forth in the fifth aspect of the present invention, it is preferable that the gradient A and B are positive values.

According to an eighth aspect of the present invention, as set forth in the fifth aspect of the present invention, it is preferable that the gradient A and B are variable relative to the damper speed and/or the target damping force.

In this case, the lateral acceleration sensor Sc and the vehicular speed sensor Sd in the embodiment correspond to the sensors that sense the moving condition of the vehicle of the present invention.

According to a configuration of the present invention, in searching the control parameter used to adjust the damping force of the damper provided to the suspension system of the vehicle from the map by using the damper speed and the target damping force decided based on respective outputs of the sensors that sense the moving condition of the vehicle, the map sets the values, which are relatively higher than the actual damping force characteristics, as map data in the area where the damper speed is less than a predetermined value, i.e., the area where the noise has the great influence on the sensor outputs. Therefore, the control parameter obtained by the map search can be set relatively low, it can be prevented that the control parameter of the damping force of the damper is varied largely or varied in a short period by the influence of noise, and the driving stability control of the vehicle can be executed exactly and the noise cause by switching the damping force of the damper can be reduced.

BRIEF DESCRIPTION OF THE DRAWINGS

FIG. 4 is a map used to search target current based on damper speed and target damping force; and FIG. 5 is a graph showing output containing a noise of a lateral acceleration sensor.

DETAILED DESCRIPTION OF THE PREFERRED EMBODIMENTS

An implementation mode of the present invention will be explained based on an embodiment of the present invention shown in the accompanying drawings hereinafter.

Figure 1:
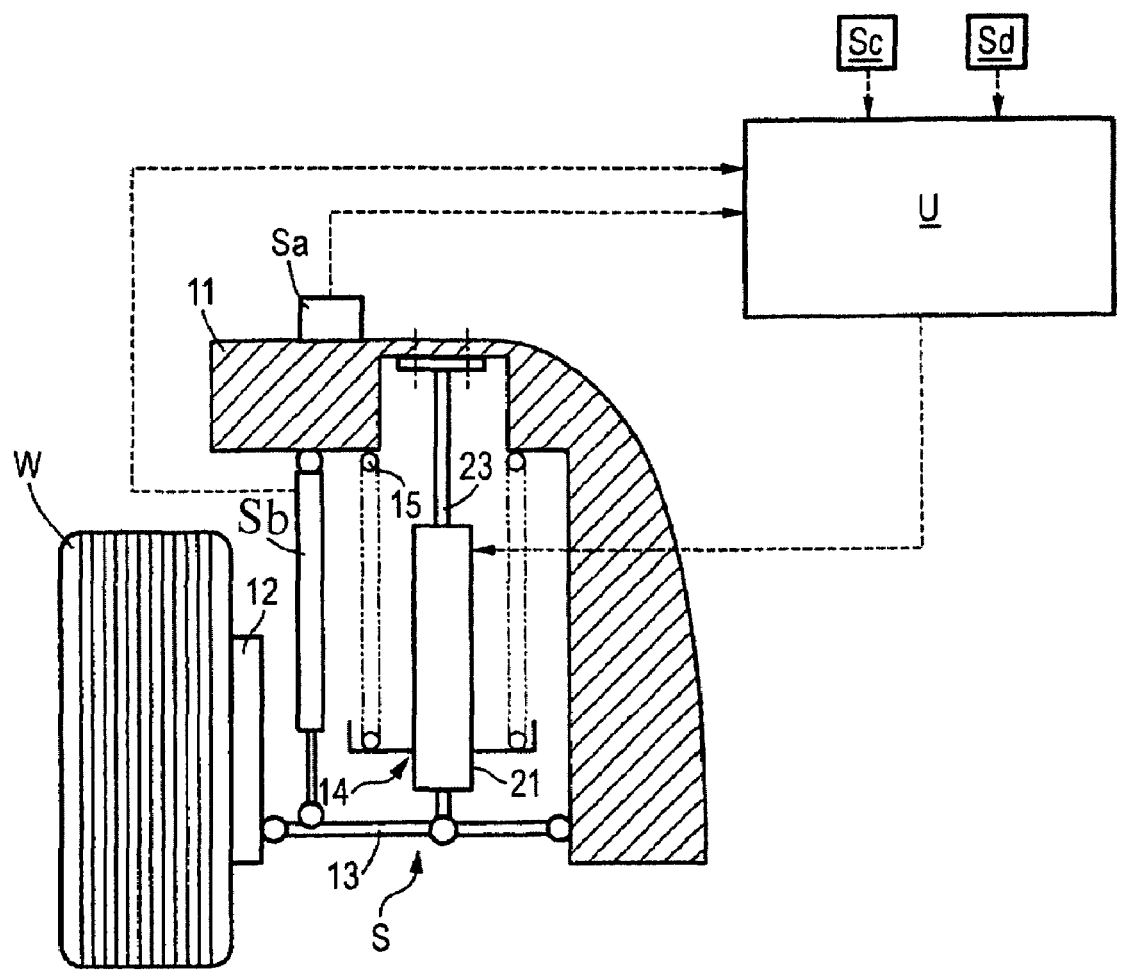
FIG. 1 is a front view of a suspension system of a vehicle.
Figure 2:
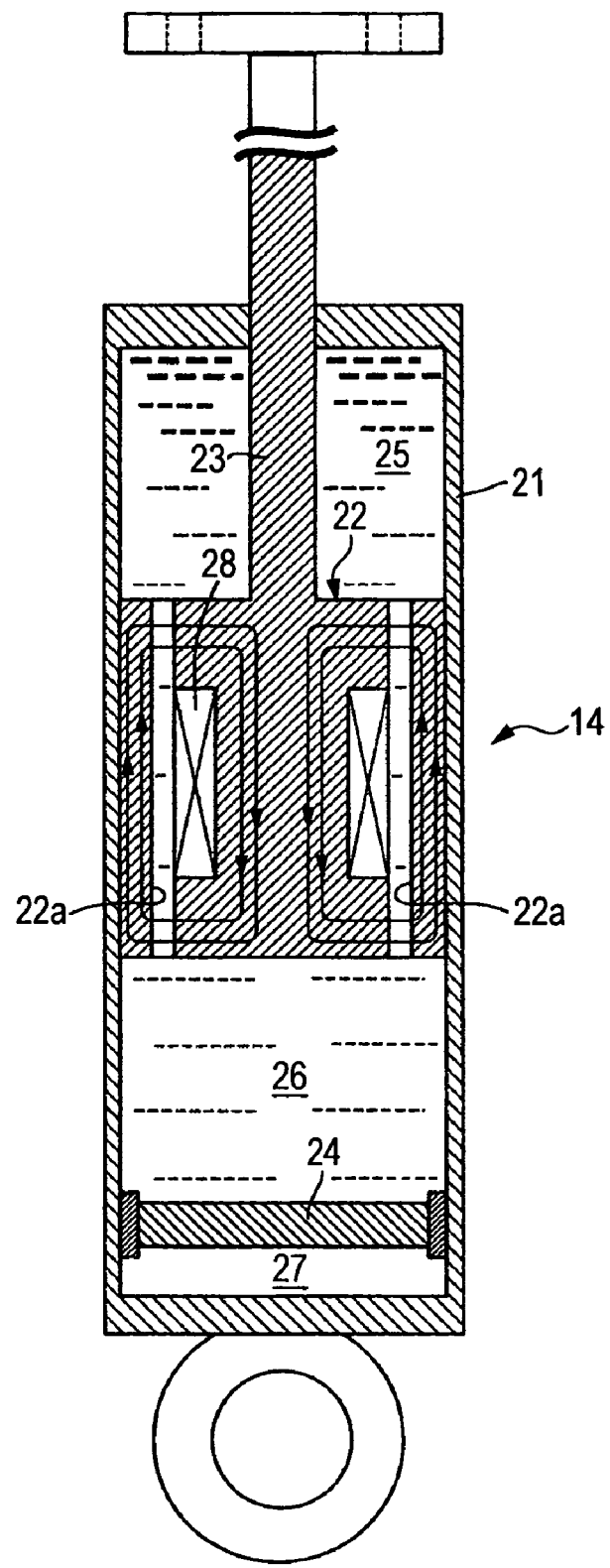
FIG. 2 is an enlarged sectional view of a adjustable damping force.
Figure 3:
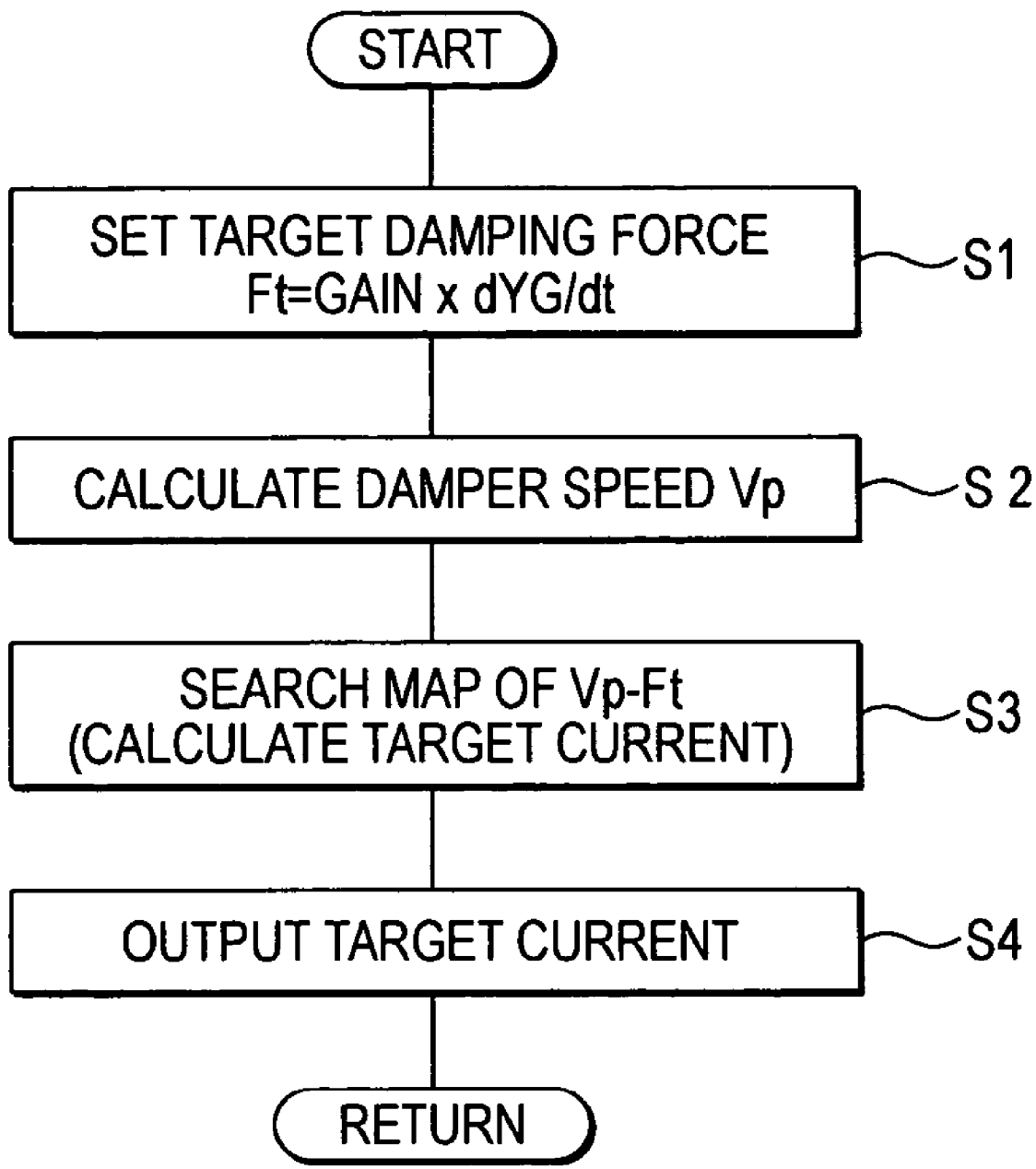
FIG. 3 is a flowchart of damping force control of the damper.

FIG. 1 to FIG. 5 show an embodiment of the present invention. FIG. 1 is a front view of a suspension system of a vehicle, FIG. 2 is an enlarged sectional view of a adjustable damping force, FIG. 3 is a flowchart of an damping force control of the damper, FIG. 4 is a map used to search a target current based on a damper speed and a target damping force, and FIG. 5 is a graph showing an output containing a noise of a lateral acceleration sensor.

As shown in FIG. 1, a suspension system S that suspends a wheel W of a four-wheel vehicle includes a suspension arm 13 for supporting a knuckle 12 vertically movably onto a vehicle body 11, a adjustable damping force 14 for connecting the suspension arm 13 and the vehicle body 11, and a coil spring 15 for connecting the suspension arm 13 and the vehicle body 11. A signal from a sprung acceleration sensor Sa for sensing sprung acceleration, a signal from a damper displacement sensor Sb for sensing displacement (stroke) of the damper 14, a signal from a lateral acceleration sensor Sc for sensing the lateral acceleration of the vehicle, and a signal from a vehicle vehicular speed sensor Sd for sensing vehicle speed are input into an electronic control unit U that controls damping force of the damper 14.

As shown in FIG. 2, the damper 14 has a cylinder 21 whose lower end is connected to the suspension arm 13, a piston 22 fitted slidably into the cylinder 21, a piston rod 23 extended upward from the piston 22 to pass through an upper wall of the cylinder 21 and connect its upper end to the vehicle body, and a free piston 24 fitted slidably into a bottom portion of the cylinder. An upper-side first fluid chamber 25 and a lower-side second fluid chamber 26 are partitioned by the piston 22 in the cylinder 21, and also a gas chamber 27 into which a compressed gas is sealed is partitioned under the free piston 24.

A plurality of fluid passages 22a . . . are formed in the piston 22 to cause an upper surface and a lower surface to communicate with each other, and the first and second fluid chambers 25, 26 are communicated mutually via these the fluid passages 22a . . . . The magneto-rheological fluids sealed in the first and second fluid chambers 25, 26 and the fluid passages 22a . . . is constituted by dispersing fine grains of the magnetic material such as iron powders into the viscous fluid such as oil. The magneto-rheological fluids has such a property that, when a magnetic field is applied, the fine grains of the magnetic material are aligned along lines of magnetic force and thus the viscous fluid is hard to flow to yield an increase in an apparent viscosity. A coil 28 is provided to an inside of the piston, and a current supply to the coil 28 is controlled by the electronic control unit U. When current is supplied to the coil 28, magnetic fluxes are generated as indicated with an arrow shown in FIG. 2 and then the viscosity of the magneto-rheological fluids is changed by the magnetic fluxes passing through the fluid passages 22a . . . .

When the damper 14 is contracted and then the piston 22 moves downward in the cylinder 21, a volume of the first fluid chamber 25 is increased but a volume of the second fluid chamber 26 is decreased. Therefore, the magneto-rheological fluids in the second fluid chamber 26 flows into the first fluid chamber 25 to pass through the fluid passages 22a . . . in the piston 22. On the contrary, when the damper 14 is expanded and then the piston 22 moves upward in the cylinder 21, a volume of the second fluid chamber 26 is increased but a volume of the first fluid chamber 25 is decreased. Therefore, the magneto-rheological fluids in the first fluid chamber 25 flows into the second fluid chamber 26 to pass through the fluid passages 22a . . . in the piston 22. At that time, the damper 14 generates an damping force by a viscous resistance of the magneto-rheological fluids passing through the fluid passages 22a . . . .

At this time, when a magnetic field is generated by supplying a current to the coil 28, an apparent viscosity of the magneto-rheological fluids that pass through the fluid passages 22a . . . in the piston 22 is increased, and thus the fluids are hard to pass through the fluid passage 22a . . . . Therefore, an damping force of the damper 14 is increased. An amount of increase in this damping force can be controlled freely by amplitude of a current that is supplied to the coil 28.

In this case, when a volume of the second fluid chamber 26 is decreased because an impulsive compressive load is applied to the damper 14, the free piston 24 is moved downward while causing the gas chamber 27 to contract, so that an impact can be absorbed. Conversely, when a volume of the second fluid chamber 26 is increased because an impulsive tensile load is applied to the damper 14, the free piston 24 is moved upward while causing the gas chamber 27 to expand, so that an impact can be absorbed. In addition, when a volume of the piston rod 23 fitted in the cylinder 21 is increased because the piston 22 is moved downward, the free piston 24 is moved downward to absorb an amount of increase in the volume.

Then, the electronic control unit U controls individually an damping force of four dampers 14 . . . of respective wheels W . . . in total based on a sprung acceleration sensed by the sprung acceleration sensor Sa, a damper displacement sensed by the damper displacement sensor Sb, and a lateral acceleration sensed by a lateral acceleration sensor Sc (or a speed sensed by a vehicular speed sensor Sd) Accordingly, the electronic control unit U executes selectively the ride control such as the skyhook control, which enhances a riding feeling by suppressing the motion of the vehicle when such vehicle gets over unevenness on a road surface, or the like and the driving stability control, which suppresses a rolling caused at a time of the vehicle turning and a pitching caused at a time of rapid acceleration or rapid deceleration, in response to the driving condition of the vehicle.

In FIG. 3, a flowchart explaining an action of the driving stability control to suppress the rolling by enhancing damping force of the dampers 14 . . . when the vehicle turns is shown.

First, in step S1, a lateral acceleration derivative dYG/dt is calculated by differentiating a lateral acceleration YG sensed by the lateral acceleration sensor Sc with respect to time. Then, target damping force Ft to be generated in the damper 14 is calculated by multiplying the lateral acceleration derivative dYG/dt by gain Gain. Then, in step S2, a damper speed Vp is calculated by differentiating damper displacement sensed by the damper displacement sensor Sb with respect to time. Then, in step S3, target current is searched by applying the target damping force Ft and the damper speed Vp to a map in FIG. 4. Then, in step S4, the target current is supplied to the coil of the damper 14 to generate the target damping force Ft. Thus, the driving stability performance can be improved by suppressing the rolling of the vehicle.

FIG. 4 is a map used to search the target current based on the target damping force Ft and the damper speed VP. When the damper speed Vp is constant, the target current is increased as the target damping force Ft is increased. In contrast, when the target damping force Ft is constant, the target current is decreased as the damper speed Vp is increased.

FIG. 5 shows a waveform of the lateral acceleration YG that the lateral acceleration sensor Sc outputs when the vehicle makes a lane change from one lane of two adjacent lanes to the other lane and then makes a lane change from the other lane to one lane once again. Here, two sinusoidal curve-like waves each having one period can be observed. Theses waves correspond to one lane change respectively, and an area in which the lateral acceleration YG is almost 0 corresponds to a situation that the vehicle is going straight on. A high-frequency noise is superposed on the waveform of the lateral acceleration YG that the lateral acceleration sensor Sc outputs. Theoretically a value of the lateral acceleration YG could have a constant value 0 when the vehicle runs straight, and the lateral acceleration derivative dYG/dt obtained by differentiating the lateral acceleration YG with respect to time could also have a constant value 0. However, actually the lateral acceleration derivative dYG/dt does not become 0 due to the influence of noise, and the target damping force Ft obtained by multiplying the lateral acceleration derivative dYG/dt by the gain Gain also does not become 0. Thus, predetermined value corresponding to the noise is output.

In a case where the target current is searched based on the target damping force Ft and the damper speed Vp by using a map in FIG. 4, only when the target damping force Ft is slightly changed if the conventional characteristics indicated by a broken line, value of the target current is largely changed in an area where the damper speed Vp is small. For example, in case the damper speed Vp is 0 m/s, the target current is changed from 1 A to 6 A when the target damping force Ft is changed simply from 100 N to 500 N. In contrast, in case the damper speed Vp is 0.04 m/s, the target current is changed simply from 1 A to 2 A even when the target damping force Ft is changed from 130 N to 1000 N.

Therefore, in the area where the damper speed Vp is small, the target current is changed largely only when the target damping force Ft is changed slightly because of the influence of noise. It is possible that an damping force of the damper 14 cannot be exactly controlled. In addition, when the target damping force Ft is changed in a short period because of the influence of noise, an damping force generated by the damper 14 is also changed in a short period. Therefore, there is the problem that the noise generated in switching the damping force of the damper 14 is increased.

Therefore, in the present embodiment, the target damping force Ft corresponding to the target current is set to predetermined value that is higher than the proper value indicated by a broken line (see a solid line) in the area where the damper speed Vp is lower than a minimum speed (in the embodiment, 0.014 m/s) in FIG. 4. According to this setting, it can be prevented that the target current is largely changed correspondingly even when the target damping force Ft is changed due to the influence of noise, and it can be prevented that the driving stability control cannot be exactly executed because the damping force of the damper 14 is unnecessarily varied during the straight running of the vehicle, and also generation of the noise to switch the damping force of the damper 14 can be suppressed to the lowest minimum.

In this case, the ride control applied when the above driving stability control is not executed is the well-known skyhook control. The dampers 14 . . . are controlled to increase the damping force when the sprung speed (the upward direction is positive) and the damper speed (the expanding direction is positive) are in the same direction, while the dampers 14 . . . are controlled to decrease the damping force when the sprung speed and the damper speed are in the opposite direction. The sprung speed can be obtained by integrating the sprung acceleration sensed by the sprung acceleration sensor Sa, and the damper speed can be obtained by differentiating a damper displacement sensed by the damper displacement sensor Sb.

With the above, the embodiment of the present invention is explained. But various changes of design can be applied to the present invention within a scope that does not depart from a gist of the invention.

For example, in the embodiment, the minimum speed of the damper speed Vp used to change the characteristics of the map, which is used to search the target current based on the damper speed Vp and the target damping force Ft, is set to 0.014 m/s. But the value of the minimum speed may be varied appropriately.

Also, in the embodiment, the driving stability control that suppresses the rolling of the vehicle based on the lateral acceleration derivative dYG/dt obtained by differentiating the lateral acceleration YG that is sensed by the lateral acceleration sensor Sc with respect to time is explained. But the present invention can also be applied to the driving stability control that suppresses the pitching of the vehicle based on the longitudinal acceleration derivative dXG/dt that is obtained by second differentiating the speed sensed by the vehicular speed sensor Sd with respect to time.

For example, in the embodiment, an damping force of the damper 14 . . . is adjustably controlled by using the magneto-rheological fluids. But an approach of variably controlling an damping force can be chosen freely.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A control system for an adjustable damping force, comprising:
   a damper provided on a suspension apparatus of a vehicle;
   a damper displacement sensor detecting displacement of the damper;
   a moving condition sensor detecting moving condition of the vehicle, wherein the moving condition is at least a lateral acceleration; and
   a control unit determining target damping force in accordance with the moving condition, determining control parameter based on a damper speed calculated on the basis of the damper displacement and the target damping force by using a map, and outputting the control parameter so as to adjust damping force of the damper,
   wherein the map is set so as to satisfy following conditions to thereby perform stable control of the damping force when the damper speed is not more than a predetermined value:
   when the damper speed is constant value and is not more than the predetermined value, the control parameter is increased with gradient A as the target damping force is increased;
   when the damper speed is constant value and is more than the predetermined value, the control parameter is increased with gradient B as the target damping force is increased, wherein the gradient A is larger than the gradient B; and
   when the target damping force is constant, the control parameter is decreased as the damper speed is increased.

2. The control system as set forth in claim 1, wherein the gradient A and B are positive values.

3. The control system as set forth in claim 1, wherein the gradient A and B are variable relative to the damper speed and/or the target damping force.

4. A control method for controlling damping force of a damper provided on a suspension apparatus of a vehicle, comprising the steps of:
   determining target damping force based on a moving condition of a vehicle, wherein the moving condition is at least a lateral acceleration;
   detecting damper displacement;
   determining control parameter of the damper based on a damper speed calculated from the damper displacement, and based on the target damping force by using a map so as to adjust the damping force of the damper; and
   outputting the damping force to the damper,
   wherein the map is set so as to satisfy following conditions to thereby perform stable control of the damping force when the damper speed is not more than a predetermined value:
   when the damper speed is constant value and is not more than the predetermined value, the control parameter is increased with gradient A as the target damping force is increased;
   when the damper speed is constant value and is more than the predetermined value, the control parameter is increased with gradient B as the target damping force is increased, wherein the gradient A is larger than the gradient B; and
   when the target damping force is constant, the control parameter is decreased as the damper speed is increased.

5. The method of claim 4, wherein the gradient A and B are positive values.

6. The method of claim 4, wherein the gradient A and B are variable relative to the damper speed and/or the target damping force.

7. A control system comprising:
   a damper speed calculation unit that calculates a damper speed in accordance with a displacement of a damper; and
   a target damping force calculation unit which calculates a target damping force in accordance with an output from a sensor detecting a moving condition of a vehicle, wherein
   a control parameter adjusting a damping force of the damper is derived from a map in accordance with the damper speed obtained by the damper speed calculation unit and the target damping force obtained by the target damping force calculation unit,
   in a region in which the damper speed is between zero and a first predetermined positive value,
   the map is set in such a manner that the damping force is maintained at a constant value which is derived when the damper speed is the first predetermined positive value, wherein:
   in a region in which the damper speed is between the first predetermined positive value and a second predetermined positive value, the control parameter increases with a first gradient;
   in a region in which the damper speed is greater than the second predetermined positive value, the control parameter increases with a second gradient; and wherein
   the first gradient is greater than the second gradient.

* * * * *